US012254048B2

(12) United States Patent
Silverstein et al.

(10) Patent No.: US 12,254,048 B2
(45) Date of Patent: Mar. 18, 2025

(54) SELF-HEALING DATA CLUSTERS

(71) Applicant: American Express Travel Related Services Company, Inc., New York, NY (US)

(72) Inventors: Karina I. Alvarez Silverstein, Plantation, FL (US); Mahasweta Dhawan, Livingston, NJ (US); Alan Wilson D'Souza, New Providence, NJ (US); Sayantan Dutta, Toronto (CA); Anmol Handa, Faridabad (IN); Shipali Jangra, Jersey City, NJ (US); Hen Israel Kamil, Miami Beach, FL (US); Rajendra Prasad Modadugu, Weston, FL (US); Sumit Prajapati, Weston, FL (US); Bhupesh Sharma, Gurgaon (IN)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 45 days.

(21) Appl. No.: 18/101,033

(22) Filed: Jan. 24, 2023

(65) Prior Publication Data
US 2024/0248930 A1 Jul. 25, 2024

(51) Int. Cl.
G06F 16/90 (2019.01)
G06F 16/906 (2019.01)

(52) U.S. Cl.
CPC .................. *G06F 16/906* (2019.01)

(58) Field of Classification Search
CPC ..... G06F 16/906; G06F 16/907; G06F 16/908
See application file for complete search history.

(56) References Cited

U.S. PATENT DOCUMENTS

| 8,442,917 B1* | 5/2013 | Burke | G06Q 50/06 |
| | | | 705/412 |
| 2013/0246257 A1* | 9/2013 | Burke | G06Q 20/102 |
| | | | 705/40 |
| 2022/0171800 A1* | 6/2022 | Kumaresan | G06F 11/321 |

* cited by examiner

*Primary Examiner* — Loc Tran
(74) *Attorney, Agent, or Firm* — Thomas Horstemeyer, LLP (57) ABSTRACT

Disclosed are various embodiments for self-healing data clusters. One or more candidates are determined from the candidate pool to be evaluated with the new record. A unique pair combination is generated for each one of the candidates of the candidate pool and the new record. Next, candidate data for the one or more candidates is identified from the existing record based at least in part on one or more matching rules. A weight is assigned to one or more matching rules. Then, the candidate data of the one or more candidates and the new record is evaluated for a data linkage. A distance is calculated between each of the unique pair combinations. Finally, the candidates of the existing record and the new record are clustered into groups.

20 Claims, 9 Drawing Sheets

SELF-HEALING DATA CLUSTERS

BACKGROUND

Many users have multiple financial transaction instruments and transaction relationships with a financial institution. These users often update their information or create new accounts. Many times, the data could be stale or outdated, which can lead to financial institutions declining authorized transactions, incorrectly calculating risk for a user, or incorrectly identifying a user. For example, users with a similar name could be linked together, which could unfairly impact one of the linked users.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for a self-healing data cluster. Generally, data clusters are formed and stored in a system without being updated on newly available data. When the data is outdated or stale, the clusters could have data linkage issues, such as an over linkage or an under linkage. When data about a user is entered into the system, it is often not connected to the existing data of that user. Data linkage can often cause issues such as inaccurate risk assessment, declining authorized transactions, or incorrectly identifying a user, client, or business.

In contrast to other approaches, which create a new cluster with new records, the approaches herein self-heal the data clusters based at least in part on the existing data and the new data. In some examples, the data clustering application can be used to generate a framework to be used for determining a relationship between existing data and new data. In other examples, the data clustering application can determine candidates to be evaluated for a relationship with the new record. In some examples, the data standardization service can transform the received user input from a client device into a standardized format. In other examples, the candidate evaluation service can determine candidates from the existing record to be assigned to a candidate pool. In other examples, the data comparison service can compare the data identifier(s) of the candidates to determine the relationship. In other examples, the connected component service can generate a graph to show the distance between the candidates.

For example, when the user signs up for a new account, the data clustering application can compare the data from the new candidate to the existing candidates for a match or data linkages. The data linkages can determine whether the candidates are over linked or under linked. The match can be determined based at least in part on how closely the data of the new candidate matches the candidate data of the candidates. Accordingly, the self-healing data clusters of the present disclosure can be used to self-heal any under linkage or over linkage of relationships of user data and to improve risk assessment.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
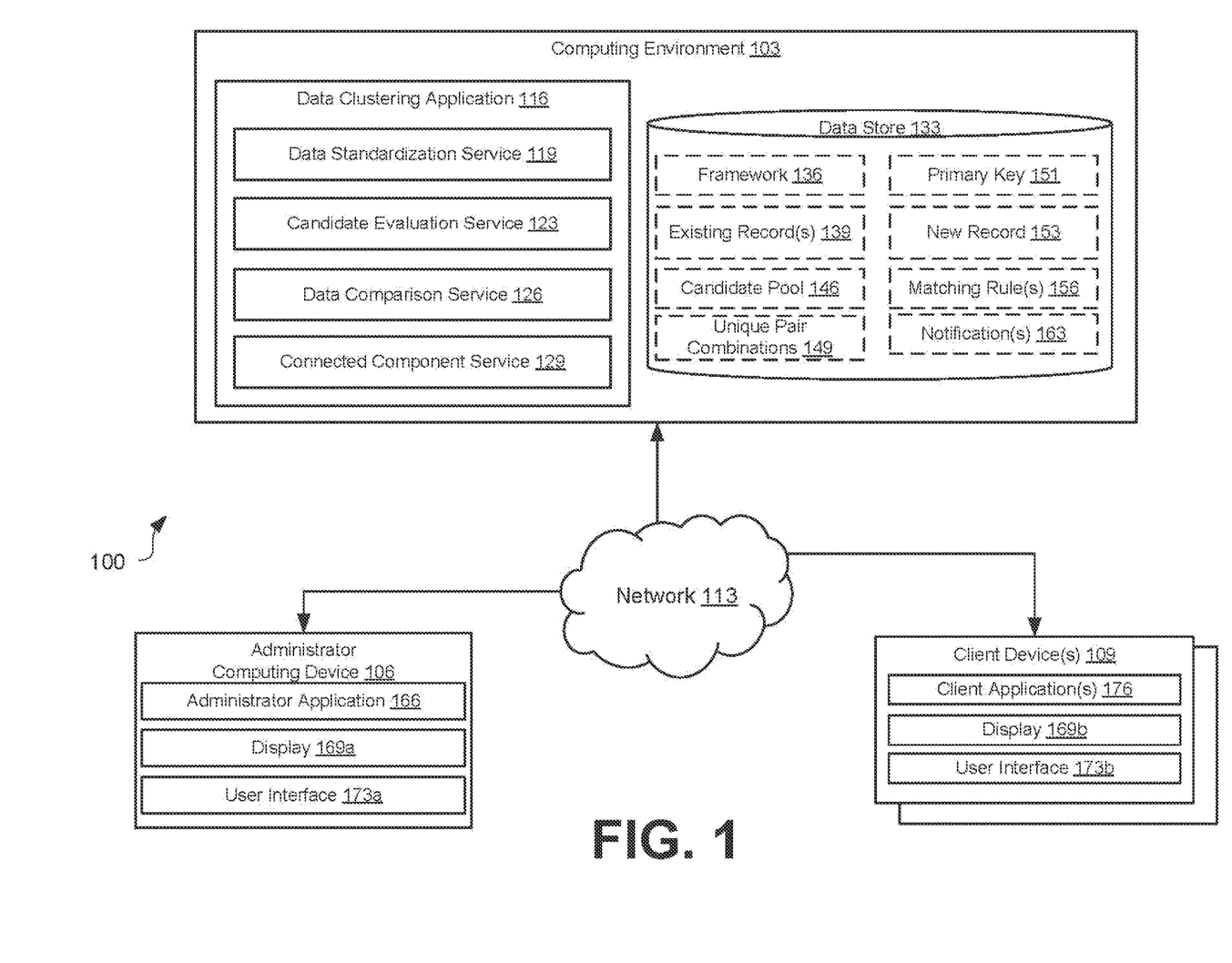
FIG. 1 is a drawing of a network environment according to various embodiments of the present disclosure.

With reference to FIG. 1, shown is a network environment 100 according to various embodiments. The network environment 100 can include a computing environment 103, an administrator computing device 106, and a client device 109 which can be in data communication with each other via a network 113.

The network 113 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (e.g., WI-FI®), BLUETOOTH® networks, microwave transmission networks, as well as other networks relying on radio broadcasts. The network 113 can also include a combination of two or more networks 113. Examples of networks 113 can include the Internet, intranets, extranets, virtual private networks (VPNs), and similar networks.

The computing environment 103 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the computing environment 103 can employ a plurality of computing devices that can be arranged in one or more server banks or computer banks or other arrangements. Such computing devices can be located in a single installation or can be distributed among many different geographical locations. For example, the computing environment 103 can include a plurality of computing devices that together can include a hosted computing resource, a grid computing resource, or any other distributed computing arrangement. In some cases, the computing environment 103 can correspond to an elastic computing resource where the allotted capacity of processing, network, storage, or other computing-related resources can vary over time.

Various applications or other functionality can be executed in the computing environment 103. The components executed on the computing environment 103 include a data clustering application 116 and other applications, services, processes, systems, engines, or functionality not discussed in detail herein. Moreover, the data clustering application 116 can contain component applications such as a data standardization service 119, a candidate evaluation service 123, a data comparison service 126, and a connected component service 129 which would be executed by the computing environment 103.

Also, various data is stored in a data store 133 that is accessible to the computing environment 203. The data store 133 can be representative of a plurality of data stores 133, which can include relational databases or non-relational databases such as object-oriented databases, hierarchical databases, hash tables or similar key-value data stores, as well as other data storage applications or data structures. Moreover, combinations of these databases, data storage applications, and/or data structures can be used together to provide a single, logical, data store. The data stored in the data store 133 is associated with the operation of the various applications or functional entities described below. This data can include a framework 136, an existing record(s) 139, a candidate pool 146, a list of unique pair combinations 149, a primary key 151, a new record 153, one or more matching rule(s) 156, one or more notification(s) 163 and potentially other data.

The framework 136 can represent the model to be used to determine the relationships between datasets. In some examples, the framework 136 can be used by the data clustering application 116 to determine how the new record 153 and the existing record(s) 139 can be compared to determine a relationship between the datasets. In other examples, the framework 136 can be used by the candidate evaluation service 123. In some other examples, the framework 136 can be used to convert the new record 153 to a standardized form. In other examples, the framework 136 can be used to convert the existing record(s) 139 to the standardized form. In other examples, the framework 136 can define the structure of data provided or received from a computing device.

The existing record(s) 139 can represent a collection of information with elements that can be manipulated and could be stored in the data store 133. The existing record(s) 139 contains a plurality of data about a candidate. For example, the existing record(s) 139 can be representative of various account information about a candidate (account number, type of card, credit limit, pin number, etc.). In other examples, the existing record(s) contains data about a candidate, such as biographical information, a customer identifier number, or a geographical information.

The candidate pool 146 can represent the candidates from the existing record(s) 139 that are to be selected to be compared and/or clustered with the new record 153. In some examples, the candidates can be determined to be assigned to the candidate pool 146 based at least in part on the primary key 151. In other examples, the candidate pool 146 can represent candidates chosen based at least in part on the matching rule(s) 156.

The unique pair combination(s) 149 can represent all possible combinations of pairs between the candidates of the candidate pool 146 and the new record 153. In other examples, the unique pair combination(s) 149 represents all possible combinations of pairs among the candidates of the candidate pool 146. In other examples, the pairs are based on nC2 combinations. The nC2 combinations represent the total number of combinations of 2 objects (datasets, candidates, etc.) given an n number of objects, where n is any integer greater than 2. In the example of FIG. 2B, there is a total of 15 nC2 combinations. In other examples, the pairs can be based on nCr combinations, where "n" is the number of objects, "C" is the possible number of combinations, and "r" is the subset of n or sample set. For example, if r were 3, in the example of FIG. 2B, there would be 20 unique pair combinations 149. The formula used to calculate the unique pair combination(s) 149 is $$C(n, r) = \binom{n}{r} = \frac{n!}{(r!(n-r)!)}.$$

The primary key 151 can represent data about a candidate of the existing record(s) 139 or the new record 153. In some examples, the primary key 151 could be a single piece of data. In other examples, the primary key could be a combination of pieces of data. For example, the primary key could be a tuple formed by the candidate's first name, last name, and date of birth. In some examples, the primary key 151 can be at least one of a customer identifier number, a biographical information set, or a geographical information set. For example, the primary key 151 of the customer identifier number can be the user's account number or certain portion of a 16-digit transaction card number. In other examples, the primary key 151 of the biographical information set can be the user's first name, last name, date of birth, etc. In some examples, the primary key 151 of the geographical information set can be the user's city, zip code, county, state, country, etc.

The new record 153 can represent a user entered collection of information with elements that can be manipulated and stored for a new candidate. The new record 153 can also represent information that entered using the administrator application 166 of the administrator computing device 106. In some examples, the new record 153 could be stored in the data store 133. The new record 153 contains a plurality of data about a new candidate. For example, the new record 153 can be representative of various account information about a new candidate (account number, type of card, credit limit, pin number, etc.). In other examples, the new record 153 contains data about a new candidate such as biographical information, a customer identifier number, or a geographical information.

The matching rule(s) 156 can include rules, models, and/or configuration data for the various algorithms or approaches employed by the data clustering application 116 to determine the candidates of the candidate pool 146. In other examples, the matching rule(s) 156 can be used to determine the closest matching candidates from the candidate pool 146 to be clustered together. In other examples, the unique pair combinations 149 between the candidates of the candidate pool 146 and the new record 153 can be paired together based at least in part on the matching rule(s) 156. In other examples, the matching rule(s) 156 can be modified by the user via the administrator application 166 of the administrator computing device 106. In some examples, the candidate evaluation service 123 can evaluate candidates based at least in part on the matching rule(s) 156.

The notification(s) 163 can represent information regarding the candidates of the existing record(s) 139 or the new record 153. For example, the notification 163 can represent information about the selection of the candidates of the candidate pool 146. In other examples, the notification can represent the clusters after self-healing has occurred. In other examples, it can present information post-clustering regarding transaction cards assigned to each of the users. In other examples, the notification(s) 163 can be displayed or presented to the user on the user interface 173a and 173b on the display 169a and 169b on the administrator computing device 106 or client device(s) 109.

The data standardization service 119 of the data clustering application 116 can be executed to convert the received data from the user into a standardized format. In some examples, the received data can be converted to a common scale or format. For example, the zip code entered could be a US Zip code+4 digits. However, zip codes might only be stored as five digits for backwards compatibility. Accordingly, in this example, the data standardization service 119 can parse the zip code to only be the five-digit zip code. In other examples, the user can use the administrator application 166 to provide a different standard to be used. In such case, the data standardization service 119 could convert all the existing record(s) 139 to follow the user provided standard. In other examples, the data standardization service 119 can parse strings of data. For example, if the input entered by the user was in the format (last name, first name), the data standardization service 119 could take the provided input "Doe, John" and standardize the data into the corresponding fields to reflect the first name is "John" and last name is "Doe." Another example could be standardization of telephone numbers, where the user can provide the phone number in a format such as "(555)-123-4567," the data standardization service 119 could standardize the phone number to "5551234567."

The candidate evaluation service 123 of the data clustering application 116 can be executed to evaluate the existing record(s) 139 for candidates for a relationship with the candidate from the new record 153. In some examples, the candidate evaluation service 123 could determine the candidates to be evaluated for a relationship between the existing candidates in the existing record(s) 139. In other examples, the candidate evaluation service 123 could determine the candidates to be evaluated for a relationship between the existing record(s) 139 candidates and the new record 153. In other examples, the candidate evaluation service 123 can create the list of unique pair combinations 149. In other examples, the candidate evaluation service 123 can determine the candidates based at least in part on existing record(s) 139 and the matching rule(s) 156.

The data comparison service 126 of the data clustering application 116 can be executed to compare the unique pair combinations 149 for a match. In some examples, the data comparison service can determine the data identifier(s) 141 to be used to compare each of the unique pair combinations 149. In other examples, the data comparison service 126 could determine the match between the unique pair combinations 149 based at least in part on the matching rule(s) 156. In other examples, the user can direct the data comparison service 126 via the administrator application 166 to compare one or more unique pair combinations that were determined by the user.

The connected component service 129 of the data clustering application 116 can be executed to generate a set of vertices in a graph that are linked to each other by a path. The connected component service 129 could execute the data comparison service 126 to work in conjunction to determine at least one of an infinity match, an absolute match, or a partial match for each unique pair combination(s) 149. The infinity match represents no path connecting the two vertices. In some examples, the connected component service 129 could detect data linkages. In other examples, the connected component service 129 could solve the data linkages (under linkage or over linkage).

In other examples, the data clustering application 116 can include a clustering algorithm service. The clustering algorithm service could be configured to measure the distance between the unique pair combinations 149. In some examples, the clustering algorithm service could use the distance theory. In other examples, the clustering algorithm service could use a distance metric such as Euclidean distance. In other examples, the clustering algorithm could use cosine similarity to measure the distance. In other examples, the clustering algorithm service could use a k-means clustering algorithm.

In some examples, the data clustering application 116 can include a linkage correction service. The linkage correction service can be executed after the connected component service 129 has been executed. The linkage correction service could be used to identify the linkages between the unique pair combinations 149 after matches are determined. The linkage correction service could use the distance to determine an under linkage or an over linkage between the unique pair combinations 149. The linkage correction service can correct an over linkage or an under linkage between the candidates of the unique pair combinations 149.

The administrator computing device 106 is representative of a plurality of computing devices that can be coupled to the network 113. The administrator computing device 106 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The administrator computing device 106 can include one or more displays 169a such as liquid crystal displays (LCDs), gas plasma-based flat panel displays, organic light emitting diode (OLED) displays, electrophoretic ink ("E-ink") displays, projectors, or other types of display devices. In some instances, the display 169a can be a component of the administrator computing device 106 or can be connected to the administrator computing device 106 through a wired or wireless connection.

The administrator computing device 106 can be configured to execute various applications such as an administrator application 166 or other applications. The administrator application 166 can be executed in the administrator computing device 106 to access network content served up by the computing environment 103 or other servers, thereby rendering a user interface 173a on the display 169a. To this end, the administrator application 166 can include a browser, a dedicated application, or other executable, and the user interface 173a can include a network page, an application screen, or other user mechanism for obtaining user input. The administrator computing device 106 can be configured to execute applications beyond the administrator application 166 such as email applications, social networking applications, word processors, spreadsheets, or other applications.

The administrator application 166 can be executed to allow the user to change the data stored in the data store 133. In some examples, the administrator application 166 can display a user interface 173a on the display 169a of the administrator computing device. In other examples, the administrator application 166 can be executed to allow the user to modify the candidate pool 146. In other examples, the administrator application 166 can be executed to change the framework 136. In other examples, the administrator application 166 can be executed to change the matching rule(s) 156. In other examples, the administrator application can identify the data from the new record 153 to be standardized.

The client device 109 is representative of a plurality of client devices that can be coupled to the network 113. The client device 109 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 109 can include one or more displays 169b, such as liquid crystal displays (LCDs), gas plasma-based flat panel displays, organic light emitting diode (OLED) displays, electrophoretic ink ("E-ink") displays, projectors, or other types of display devices. In some instances, the display 169b can be a component of the client device 109 or can be connected to the client device 109 through a wired or wireless connection.

The client device 109 can be configured to execute various applications such as a client application 176 or other applications. The client application 176 can be executed in a client device 109 to access network content served up by the computing environment 103 or other servers, thereby rendering a user interface 173b on the display 169b. To this end, the client application 176 can include a browser, a dedicated application, or other executable, and the user interface 173b can include a network page, an application screen, or other user mechanism for obtaining user input. The client device 109 can be configured to execute applications beyond the client application 176 such as email applications, social networking applications, word processors, spreadsheets, or other applications.

The client application 176 can be used by the user to interact with the financial institution or other services that use the data clustering application 116. In some examples, the user interface 173b of the client device 109 can present an application to apply for a transaction card on the display 169b of the client device. In other examples, the user can interact with the user interface 173b on the display 169b of the client device 109 to change settings of the client application 176. For example, the user can use the client application 176 to perform an audit.

Next, a general description of the operation of the various components of the network environment 100 is provided. Although the following description provides a general description of the interactions between the various components of the network environment 100, other interactions are also encompassed by the various embodiments of the present disclosure.

To begin, a financial institution or other entity may keep records or data that pertain to users, clients, businesses, etc. In order to assess risk, approve transactions, or perform other actions, the entity needs accurate records about the user, the client, or the businesses. The available data would be stored in the data store 133 of the computing environment 103. The existing record(s) 139 contain standardized data about the user, the client, or the businesses.

To start, the user can apply for a new financial transaction instrument or a enter into a transaction relationship with a financial instrument by submitting data with the user interface 173b of the client application 176. The user submitted data could be used to calculate and analyze risk, verify the user, or authorize a transaction. The received data would be stored in the new record 153. To assess the user submitted data, it needs to be changed to the accepted type. The data standardization service 119 will take the user provided data and transform it to the standardized form.

To continue with assessing the data, the data clustering application 116 generates the framework 136 that could be used to determine a relationship between the existing record(s) 139 and the new record 153. The existing record(s) contains data about a candidate which will be used to determine the candidates to be evaluated for a relationship with the new record 153. The candidates selected from the existing record(s) 139 will be pulled into the candidate pool 146 along with the new record 153. The candidate evaluation service 123 will create a list of the unique pair combinations 149 among all the candidates in the candidate pool 146. The unique pair combinations 149 can be based on a nC2 pairing or a nCr pairing.

Next, the candidates of the unique pair combinations 149 will be compared based at least in part on the framework. The data comparison service 126 can use the primary key 151 to compare the candidates. The data identifier(s) can be identified based at least in part on the matching rule(s) 156. The matching rule(s) 156 can be assigned a weight. The candidates will then be evaluated for a match and a data linkage based at least in part on the framework 136. After the evaluation, the connected component service 129 could generate a graph with each candidate representing one of the vertices. The connected component service 129 could connect the vertices based on the data linkage. The data clustering application 116 can calculate the distance between each of the vertices to be used for the match result. The data clustering application 116 can cluster the candidates of the new record 153 and the existing record(s) 139 into groups based on the distance. Based on the match results and/or the groups, the data clustering application 116 could generate or store notification(s) of the match results and/or the groups.

Figure 2A:
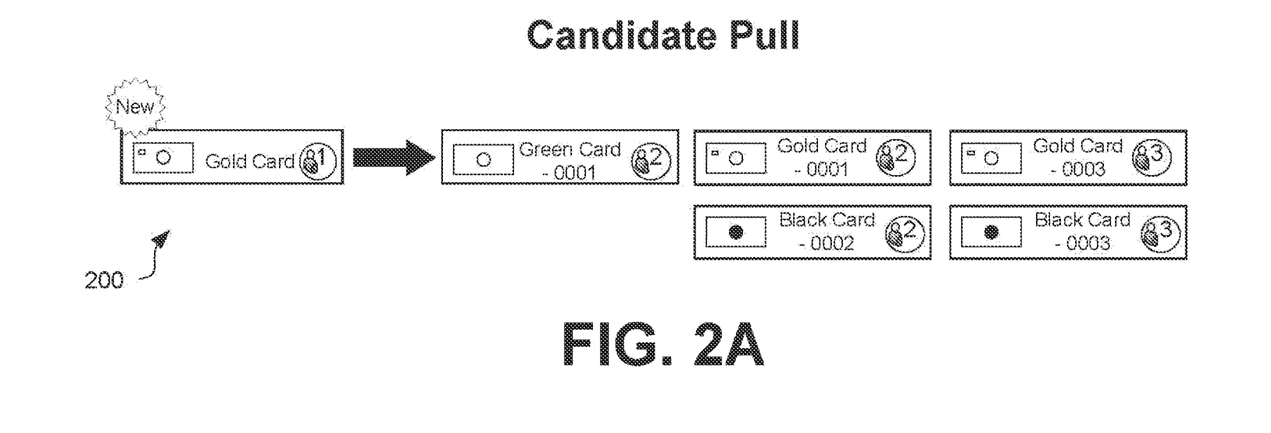
FIG. 2A is a pictorial diagram of an example data clustering process according to various embodiments of the present disclosure.
Figure 2B:
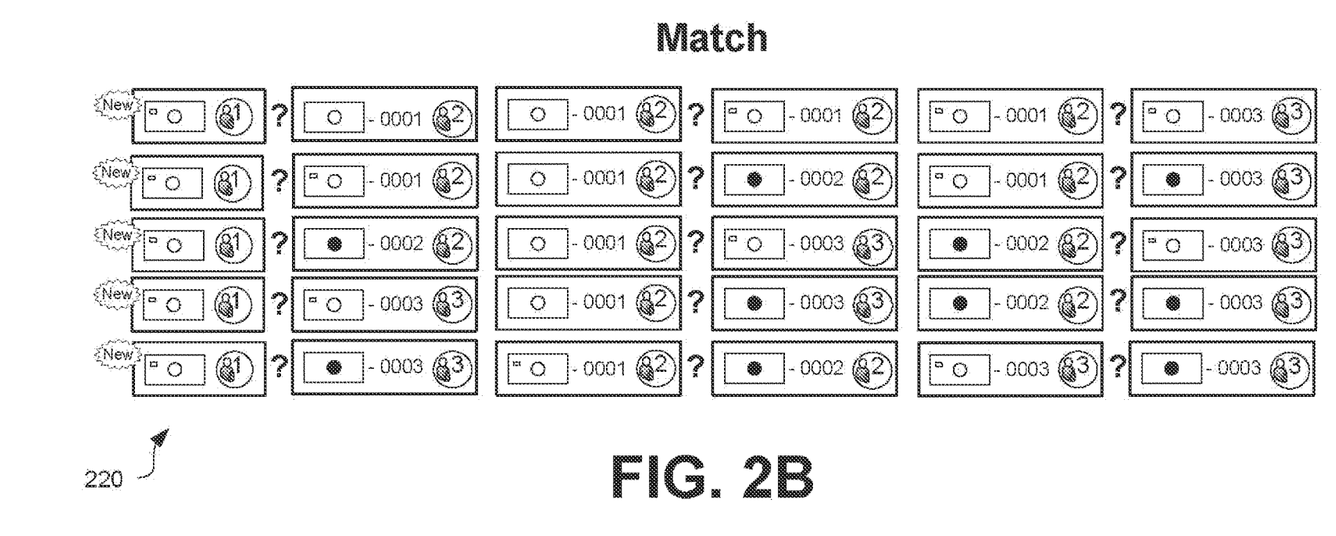
FIG. 2B is a pictorial diagram of an example data clustering process according to various embodiments of the present disclosure.

Referring next to FIG. 2A, shown is an example 200 of the candidate determination of the self-healing data process based on clustering the candidates from the existing record(s) 139 and the new record 153. In this example, a new user is applying for a "gold card." The new user is labeled as "1" and has a "new" sign on the card. Based on the input received from the user, the data clustering application 116 determined that the candidates evaluated for a relationship from the existing record(s) 139 were user "2" and user "3." This determination can be made based at least in part on the primary key 151. Users "1," "2," and "3" with their card(s) will be assigned to the candidate pool. Based at least in part on the available data about a candidate from the existing record(s) 139, the data clustering application 116 can determine that the green card "0001," gold card "0001", and black card "0002" belong to user "2." The data clustering application 116 can determine that gold card "0003" and black card "0003" belong to user "3." The partial match can be represented by user "2" in FIG. 2A. While the green card did not belong to user "2," based on the available, the card was over linked to user "2" and under linked to user "1." For example, user "1" is applying for a gold card. In order to apply for the gold card, user "1" could be asked to input information such as personally identifiable information. In some examples, user "1" could be asked to input the primary key 151 such as biographical information or geographical information. The received user information can be stored in the data store 133 as a part of the new record 153.

Turning now to FIG. 2B, shown is an example 220 of the match determination of the self-healing data process based on clustering the candidates from the existing record(s) 139 and the new record 153. In this example, each user is evaluated and a list of unique pair combinations 149 is generated. Thereafter, each unique pair combination is evaluated for a match based at least in part on the one or more matching rule(s) 156. User "1" will be evaluated against the green card "0001," gold card "0001," and black card "0002" of user "2" and gold card "0003" and black card "0003" of user "3." Next, the green card "0001" will be evaluated against the gold card "0001," black card "0002" of user "2" and gold card "0003" and black card "0003" of user "3." Next, the gold card "0001" will be evaluated against black card "0002" of user "2" and against gold card "0003" and black card "0003" of user "3." Next, the black card "0002" will be evaluated against gold card "0003" and black card "0003" of user "3." Finally, gold card "0003" will be evaluated against black card "0003" which covers all combinations of cards and users.

Figure 2C:
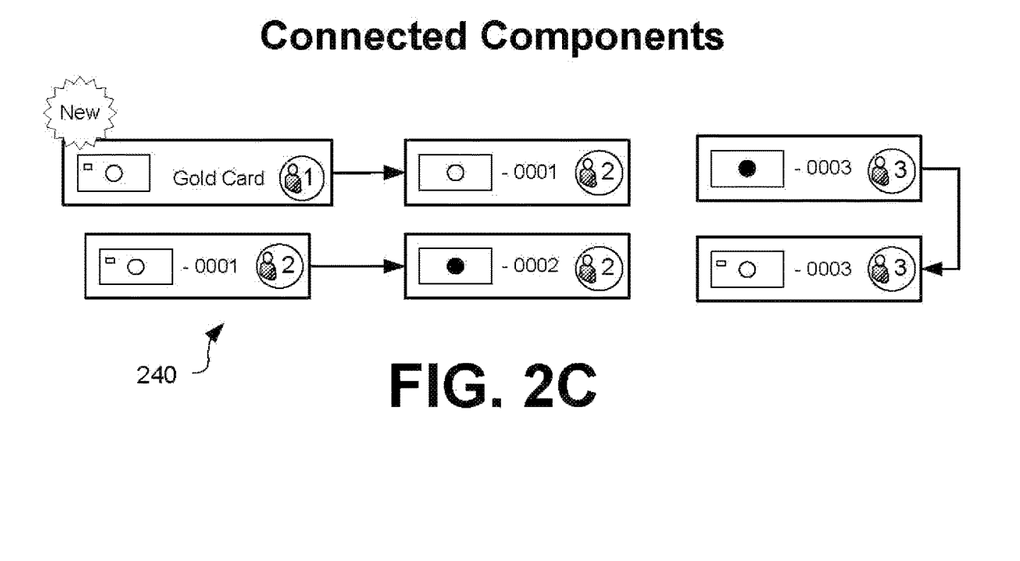
FIG. 2C is a pictorial diagram of an example data clustering process according to various embodiments of the present disclosure.

Moving on to FIG. 2C, shown is an example 240 of the connected components of the self-healing data process based at least in part on clustering the candidates from the existing record(s) 139 and the new record 153. In this example, an undirected graph with each user and card (acting as nodes) is connected based at least in part on the framework 136 and/or the matching rule(s) 156. In this example, the connected component service 129 of the data clustering application 116 has connected user "1" with the new record 153 and green card "0001," which was originally stored as belonging to user "2." Next, the connected component service 129 has determined that gold card "0002" and black card "0002" are connected to user "2." Lastly, the connected component service 129 has determined that the gold card "0003" and black card "0003" are connected to user "3." For example, in FIG. 2C, user "1" and user "3" did not have any connecting vertices when compared. Therefore, the data clustering application 116 could determine they belong to different clusters. For example, the connected component service 129 in FIG. 2C connects each of the gold card, black card, and/or green card to each corresponding user. In other examples, the connected component services 129 can connect the vertices in the graph based at least in part on the matching rule(s) 156. In other examples, the vertices could be connected based at least in part on the data identifier(s) matching.

Figure 2D:
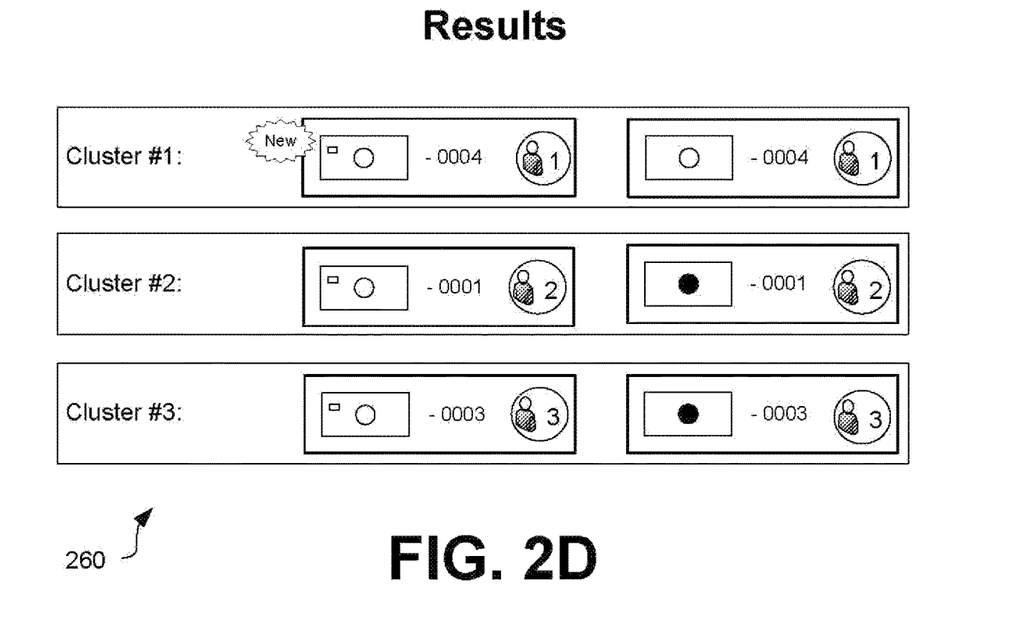
FIG. 2D is a pictorial diagram of an example data clustering process according to various embodiments of the present disclosure.

Moving on to FIG. 2D, shown is an example 260 of the healed clusters of the self-healing data process based on clustering the candidates from the existing record(s) 139 and the new record 153. In this example, cluster "#1," "#2," and "#3" are sorted and healed with the correct information. Cluster "#1" contains the new gold card "0004" and a corrected green card "0004" belonging to user "1." Cluster "#2" contains the gold card "0001" and black card "0001" belonging to user "2." Lastly, cluster "#3" contains the gold card "0003" and black card "0003" belonging to user "3." When the data clustering application was determining candidates, the green card "0004" was originally incorrectly determined to be green card "0001" belonging to user "2." However, with the new record 153 provided by user "1" while applying for the gold card, the data clustering application 116 was able to correct the inaccuracy and reflect accurately the cards belonging to each candidate in the candidate pool 146. The absolute match can be represented by user "3" as user "3" only matched with the black card and gold card belonging to user "3."

Figure 3A:
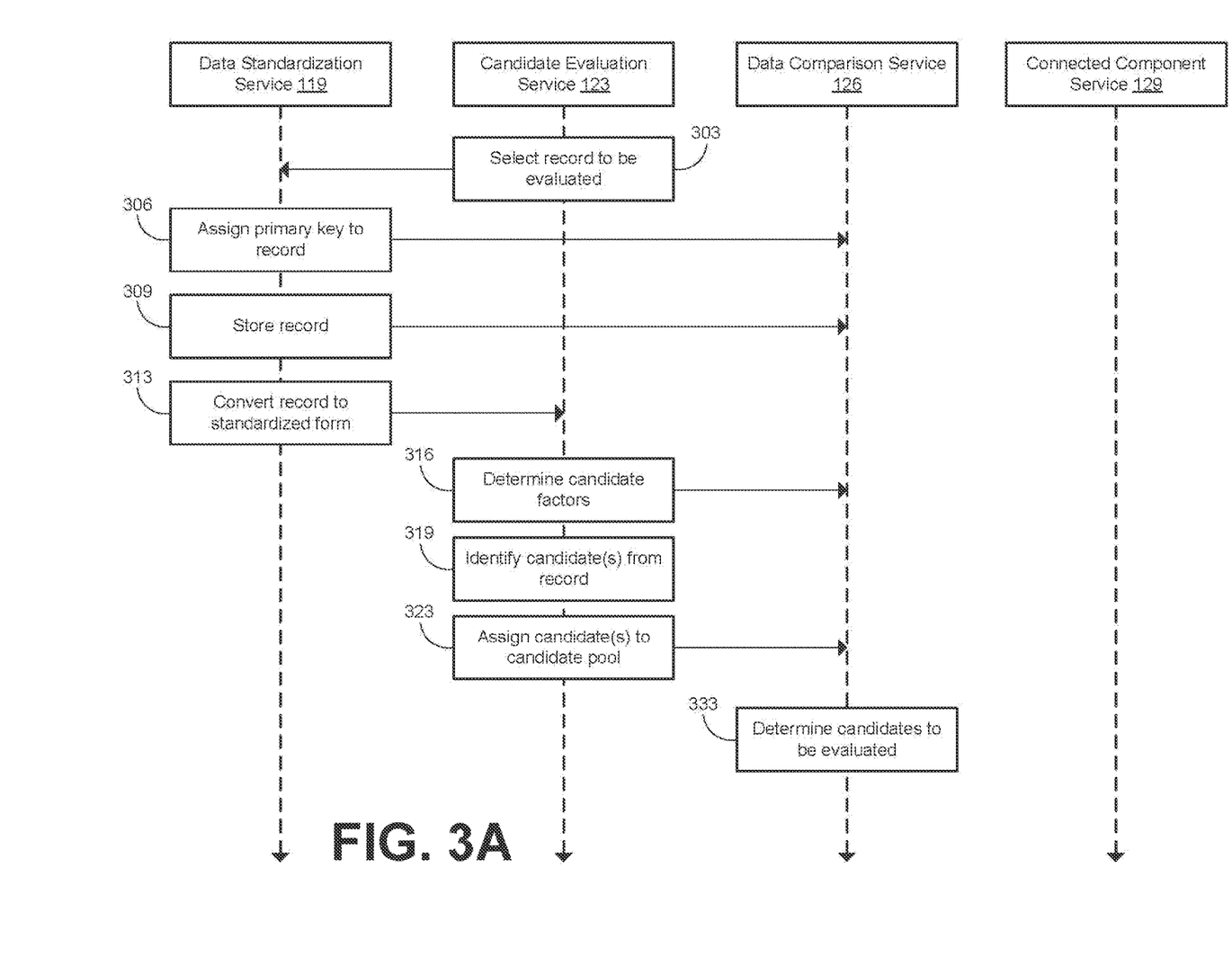
FIG. 3A is a sequence diagram illustrating one example of the interactions between the various components of the network environment of FIG. 1 according to various embodiments of the present disclosure.
Figure 3B:
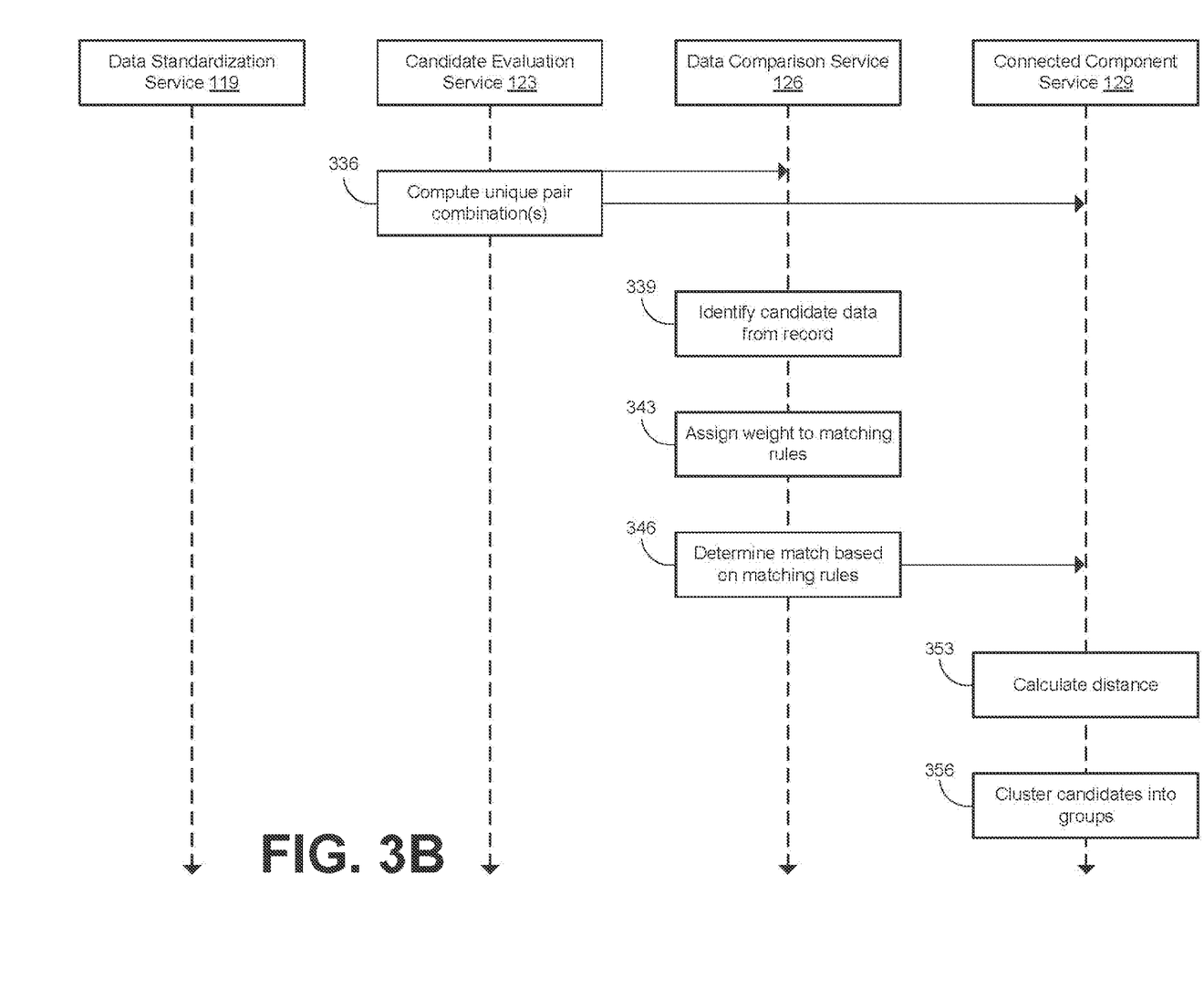
FIG. 3B is a sequence diagram illustrating one example of the interactions between the various components of the network environment of FIG. 1 according to various embodiments of the present disclosure.

Referring next to FIGS. 3A and 3B, shown is a sequence diagram that provides one example of the operation of a portion of the data clustering application 116. The sequence diagram of FIGS. 3A and 3B provides merely an example of the many different types of functional arrangements that can be employed to implement the operation of the depicted portion of the data clustering application 116. As an alternative, the sequence diagram of FIGS. 3A and 3B can be viewed as depicting an example of elements of a method implemented within the network environment 100.

Beginning with block 303, the candidate evaluation service 123 of the data clustering application 116 can select the new record 153 to be evaluated for a relationship of similarities for clustering. The data clustering application 116 can request the new record 153 from another device. In other examples, the new record 153 could include data entered by the user on the client application 176.

At block 306, the data standardization service 119 of the data clustering application 116 can assign the primary key 151 to the new record 153. The primary key 151 can be a customer identifier number, a set of biographical information, a set of geographical information, or a set of personally identifiable information. For example, the first name and last name of a user would be the primary key 151 under the set of biographical information set. In other examples, the customer identifier number can be a numerical sequence or an alphanumerical sequence. In other examples, the geographical information could be the street, city, state, or country where the user resides. The primary key 151 could be a combination of the primary key 151.

At block 309, the data standardization service 119 the data clustering application 116 the stores the new record 153 in the data store 133. In some examples, the new record 153 could be stored based at least in part on the primary key 151. In other examples, the new record 153 could be stored in the candidate pool 146.

At block 313, the data standardization service 119 of the data clustering application 116 can convert the new record 153 to the standardized form. In some examples, the standardized form can be provided by the user of the administrator computing device 106 via the administrator application 166. In other examples, the new record 153 can be standardized to the format of the existing record(s) 139. In other examples, the new record 153 can be cleansed. For example, the data in the new record 153 can be cleansed if a user inputs alphabetical characters in a numerical entry box.

At block 316, the candidate evaluation service 123 of the data clustering application 116 determines one or more candidate factors. In some examples, the candidate factors could be the type of account (credit card, checking account, savings account, etc.). In other examples, the candidate factor could be the type of entity (user, corporation, small business, etc.).

At block 319, the candidate evaluation service 123 of the data clustering application 116 determines one or more candidate(s) from the existing record(s) 139. In some examples, the candidate(s) can be determined or evaluated for a relationship. In other examples, the candidate(s) could be determined based at least in part on the candidate factors. In other examples, the candidate(s) can be determined based at least in part on the primary key 151.

At block 323, the candidate evaluation service 123 of the data clustering application 116 assigns the one or more candidates from the existing record(s) 139 to the candidate pool 146. In some examples, the data clustering application 116 may not have determined any candidates to be assigned to the candidate pool. In other examples, the candidate pool can contain candidates manually selected by the user via the administrator application 166.

At block 333, the data comparison service 126 of the data clustering application 116 determines one or more candidates from the candidate pool 146 to be evaluated for a relationship with the new record 153. In some examples, the data clustering application 116 could determine fewer candidates to be evaluated then the total candidates in the candidate pool 146.

At block 336, the candidate evaluation service 123 of the data clustering application 116 can compute a list of the unique pair combinations 149. In some examples, the unique pair combinations 149 could be between each one of the candidates in the candidate pool that existed in the existing record(s) 139. In other examples, the unique pair combinations 149 can include the candidate from the new record 153.

At block 339, the data comparison service 126 of the data clustering application 116 can identify candidate data 143 of the candidates in the candidate pool 146. In some examples, data about a candidate could be determined based at least in part on the matching rule(s) 156. In other examples, the data identified about a candidate could be based at least in part on the primary key 151.

At block 343, the data comparison service 126 of the data clustering application 116 assigns a weight to the one or more matching rules 156. In some examples, one of the matching rules 156 could be weighted higher than the other matching rules 156 based on the dataset being evaluated. In other examples, the user of the administrator computing device 106 can provide the weight for the matching rule(s) 156 via the administrator application 166. The user provided weight could be communicated from the administrator computing device 106 to the data clustering application 116.

At block 346, the linkage correction service of the data clustering application 116 can evaluate the candidate data for data linkages. In some examples, the data could be under linked. In other examples, the data could be over linked.

At block 349, the data comparison service 126 of the data clustering application 116 evaluates the data about a candidate for a match between the one or more candidates of the existing record(s) 139 and the new record 153. In some examples, the data clustering application 116 can evaluate the candidates of the existing record(s) 139 and the candidate of the new record 153 based at least in part on the framework 136. In other examples, the data clustering application 116 can evaluate the candidates based at least in part on the matching rule(s).

At block 353, the connected component service 129 of the data clustering application 116 can calculate the distance between each of the unique pair combinations 149. In some examples, the distance could be the same for all pairs of the unique pair combinations 149. In some examples, the distance between each of the unique pair combinations 149 could be represented by a graph generated by the connected component service 129. In other examples, the distance between each of the unique pair combinations 149 could be used to calculate a score to determine the level of match, such as "best match," "absolute match," or "infinity match."

At block 356, the connected component service 129 of the data clustering application 116 can cluster the candidates of the existing record(s) 139 and the new record 153 into groups. In some examples, the groups could be assigned a cluster ID. In other examples, the clustered group could be based at least in part on the distance between each of the unique pair combinations 149. In other examples, the clustered group could be based at least in part on the score and/or the level of match.

Figure 4A:
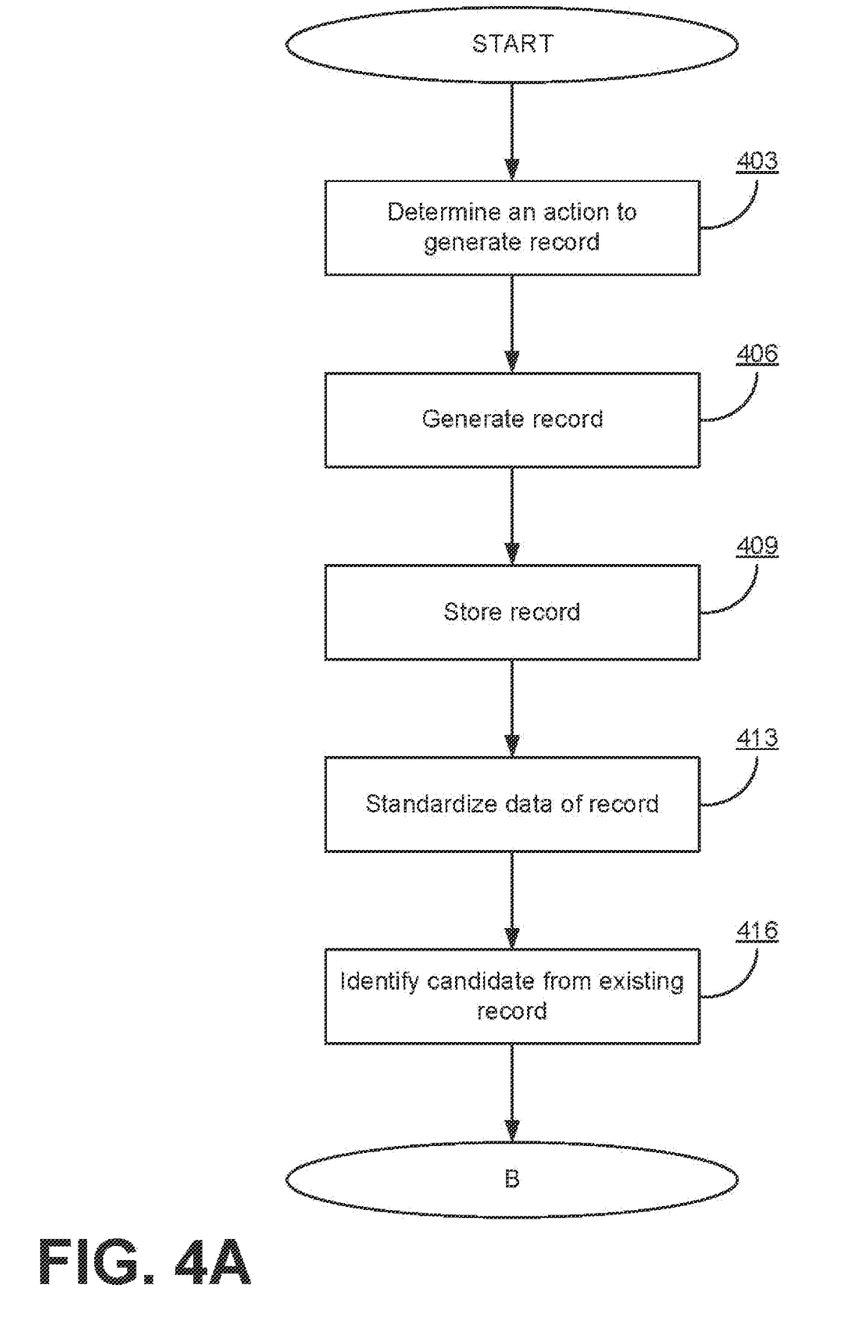
FIG. 4A is a flowchart illustrating one example of functionality implemented as portions of an application executed in a computing environment in the network environment of FIG. 1 according to various embodiments of the present disclosure.
Figure 4B:
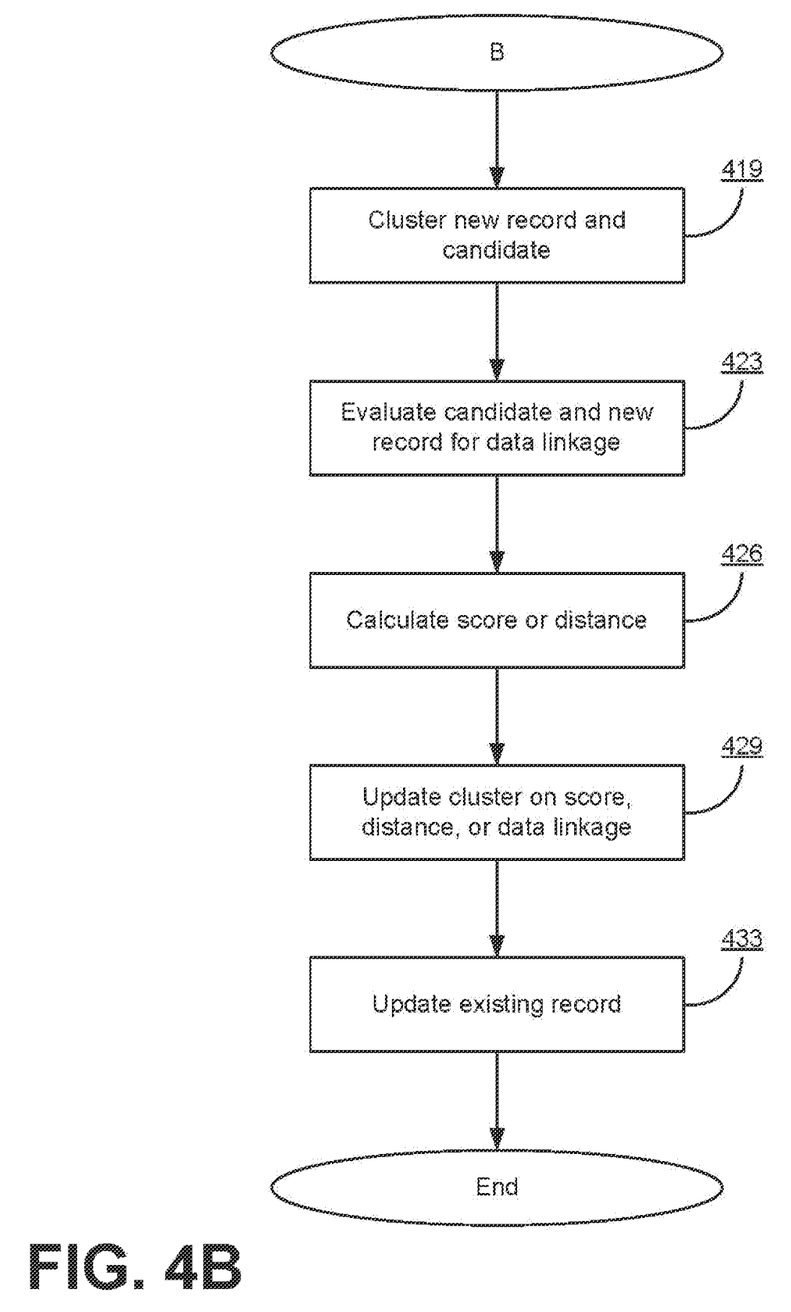
FIG. 4B is a flowchart illustrating one example of functionality implemented as portions of an application executed in a computing environment in the network environment of FIG. 1 according to various embodiments of the present disclosure.

Referring next to FIGS. 4A and 4B, shown is a flowchart 400 that provides one example of the operation of a portion of the data clustering application 116. The flowchart of FIGS. 4A and 4B provide merely an example of the many different types of functional arrangements that can be employed to implement the operation of the depicted portion of the data clustering application 116. As an alternative, the flowchart of FIGS. 4A and 4B can be viewed as depicting an example of elements of a method implemented within the network environment 100.

Beginning with block 403, the data clustering application 116 can determine an action taken by the user to generate the new record 153. In some examples, the action can be applying for a new credit card. In other examples, the action can be updating information on an existing account. In some other examples, the action can be an audit of one or more accounts.

At block 406, the data clustering application 116 can generate the new record 153 based at least in part on the user applying for a new card. In some examples, the new record can be generated based at least in part on the user updating their account. In other examples, the new record can be generated based at least in part on an audit of the account.

At block 409, the data clustering application 116 can store the new record in the data store. In some examples, received user information can be stored in the data store 133 as a part of the new record 153.

At block 413, the data clustering application 116 can convert the new record 153 to the standardized form. In some examples, the standardized form can be provided by the user of the administrator computing device 106 via the administrator application 166. In other examples, the new record 153 can be standardized to the format of the existing record(s) 139. In other examples, the new record 153 can be cleansed. For example, the data in the new record 153 can be cleansed if a user inputs alphabetical characters in a numerical entry box.

At block 416, the data clustering application 116 can identify candidate data 143 of the candidates in the candidate pool 146. In some examples, data about a candidate could be determined based at least in part on the matching rule(s) 156. In other examples, the data identified about a candidate could be based at least in part on the primary key 151.

At block 419, the data clustering application 116 can cluster the candidates of the existing record(s) 139 and the new record 153 into groups. In some examples, the groups could be assigned a cluster ID. In other examples, the clustered group could be based at least in part on the distance between each of the unique pair combinations 149.

At block 423, the data clustering application 116 can evaluate the data about a candidate for a match between the one or more candidates of the existing record(s) 139 and the new record 153. In some examples, the data clustering application 116 can evaluate the candidates of the existing record(s) 139 and the candidate of the new record 153 based at least in part on the framework 136. In other examples, the data clustering application 116 can evaluate the candidates based at least in part on the matching rule(s). In other examples, the data clustering application 116 can evaluate the candidate data for data linkages based at least in part on the match. In some examples, the data could be under linked. In other examples, the data could be over linked.

At block 426, the data clustering application 116 can calculate the distance between each of the unique pair combinations 149. In some examples, the distance could be the same for all pairs of the unique pair combinations 149. In some examples, the distance between each of the unique pair combinations 149 could be represented by a graph generated by the connected component service 129. In other examples, the distance between each of the unique pair combinations 149 could be used to calculate a score to determine the level of match, such as "best match," "absolute match," or "infinity match."

At block 429, the data clustering application 116 can update the cluster created in block 419 based at least in part on the distance between each of the unique pair combinations 149. In other examples, the cluster created in block 419 can be updated based at least in part on the calculated score. In some other examples, the cluster created in block 419 can be updated based at least in part on the data linkage.

At block 433, the data clustering application 116 can update the existing record(s) 139 based at least in part on the data linkage. In other examples, the existing record(s) 139 can be updated based at least in part on the user entered information.

Figure 5A:
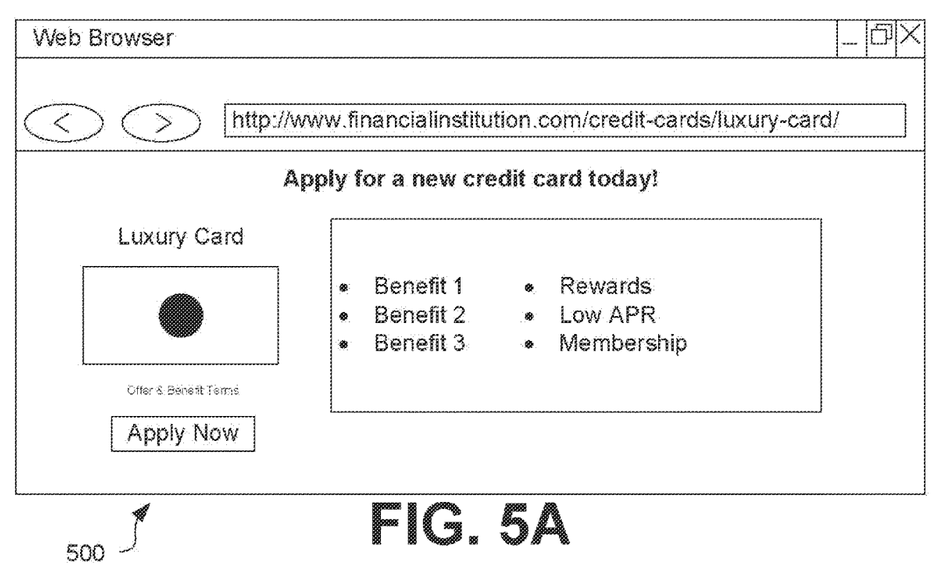
FIG. 5A is a user interface diagram according to various embodiments of the present disclosure.

Referring next to FIG. 5A, shown is a user interface diagram 500 depicting an example of the candidate determination of the self-healing data process based on clustering the candidates from the existing record(s) 139 and the new record 153. In some examples, the user interface 173a can be rendered on the display 169a by the web browser. In other examples, the user interface 173a can be rendered and displayed on a dedicated application, a mobile application, or other related environments. In some examples, the user interface 173b can be rendered on the display 169b by the web browser. In other examples, the user interface 173b can be rendered and displayed on a dedicated application, a mobile application, or other related environments. In this example, a user is applying for a "luxury card." The user is using a web browser to apply for the "luxury card." The website displays information about the card and some of the benefits of the "luxury card." To begin the application process for applying for the "luxury card," the user is presented with an "Apply Now" button. The web browser will redirect the user once the user clicks on "Apply Now" button.

Figure 5B:
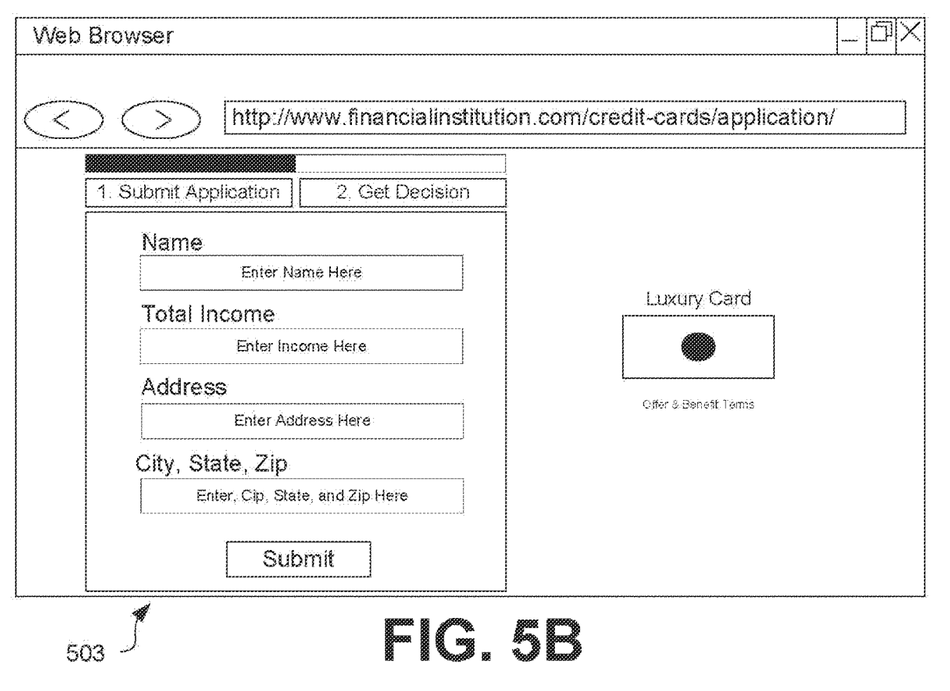
FIG. 5B is a user interface diagram according to various embodiments of the present disclosure.

Turning now to FIG. 5B, shown is a user interface diagram 503 depicting an example of the candidate determination of the self-healing data process based on clustering the candidates from the existing record(s) 139 and the new record 153. In some examples, the user interface 173a can be rendered on the display 169a by the web browser. In other examples, the user interface 173a can be rendered and displayed on a dedicated application, a mobile application, or other related environments. In some examples, the user interface 173b can be rendered on the display 169b by the web browser. In other examples, the user interface 173b can be rendered and displayed on a dedicated application, a mobile application, or other related environments. In this example, the user has clicked the "Apply Now" button as shown in FIG. 5A to begin the application process for the "luxury card." The website displays a fillable form. In some examples, the website may display a progress bar. In other examples, the website can display the card the user chose. In order to apply for the "luxury card," the user could be asked to input information such as personally identifiable information. In some examples, the user could be asked to input the primary key 151 such as biographical information or geographical information. The received user information can be stored in the data store 133 as a part of the new record 153.

Figure 5C:
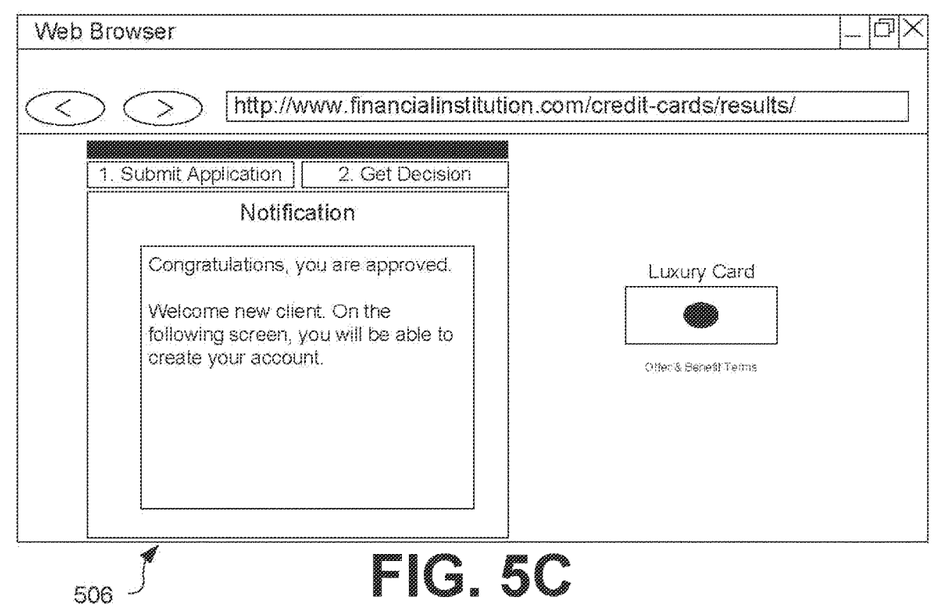
FIG. 5C is a user interface diagram according to various embodiments of the present disclosure.

Turning now to FIG. 5C, shown is a user interface diagram 506 depicting an example of the connected components of the self-healing data process based at least in part on clustering the candidates from the existing record(s) 139 and the new record 153. In some examples, the user interface 173a can be rendered on the display 169a by the web browser. In other examples, the user interface 173a can be rendered and displayed on a dedicated application, a mobile application, or other related environments. In some examples, the user interface 173b can be rendered on the display 169b by the web browser. In other examples, the user interface 173b can be rendered and displayed on a dedicated application, a mobile application, or other related environments. In this example, the notification 163 is displayed on the website informing the user of their approval status. In some examples, another result, such as denied, could be displayed. The notification 163 further states the user is a new user. This result is determined based on the new record 153 of the user being clustered with existing record(s) 139. The clustering process can determine the user is a new user based at least in part on determining the new record 153 did not match the existing record(s) 139. In other examples, the data clustering application 116 can use the matching rules to determine the user is a new user. In some examples, the notification may provide further information, such as the user being able to create their online account on the following page.

Figure 5D:
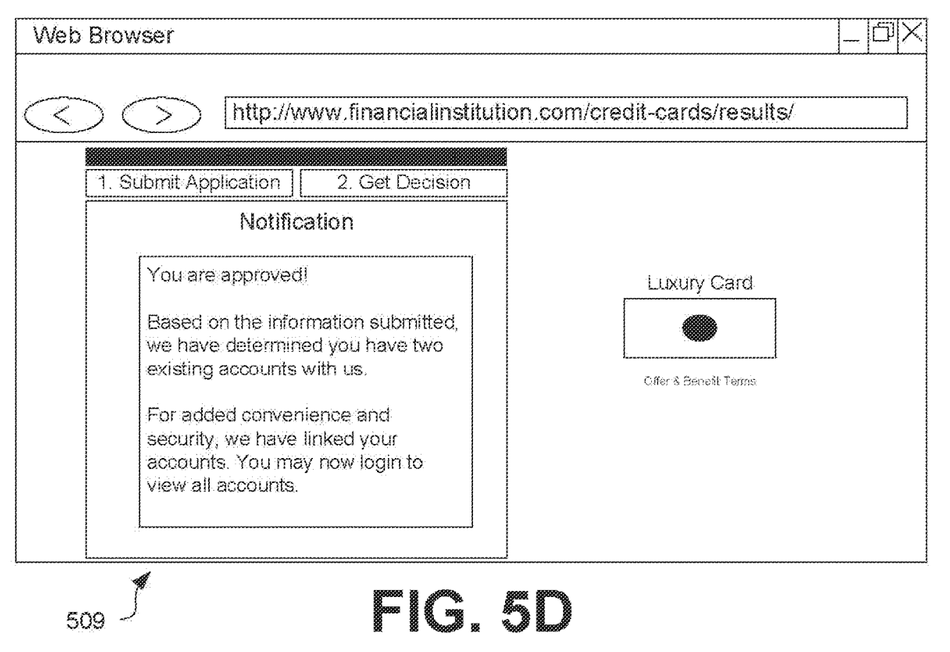
FIG. 5D is a user interface diagram according to various embodiments of the present disclosure.

Turning now to FIG. 5D, shown is a user interface diagram 509 depicting an example of the connected components and the healed clusters of the self-healing data process based at least in part on clustering the candidates from the existing record(s) 139 and the new record 153. In some examples, the user interface 173a can be rendered on the display 169a by the web browser. In other examples, the user interface 173a can be rendered and displayed on a dedicated application, a mobile application, or other related environments. In some examples, the user interface 173b can be rendered on the display 169b by the web browser. In other examples, the user interface 173b can be rendered and displayed on a dedicated application, a mobile application, or other related environments. In this example, the notification 163 is displayed on the website informing the user of their approval status. In this example, the data clustering application 116 has determined the user has other credit cards/accounts based on clustering. Based on this determination, the data clustering process 116 can link the new account and the existing accounts together.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the sequence diagrams can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the computing environment 103.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
a computing device comprising a processor and a memory; and
machine-readable instructions stored in the memory that, when executed by the processor, cause the computing device to at least:
receive a transaction action from a user;
receive a data input from the user, wherein the data input is stored in a data store;
generate a new record based at least in part on the data input;
select the new record to be evaluated for a relationship with an existing record;
assign a primary key to the new record;
store the new record in the data store based at least in part on the primary key;
identify at least one candidate factor based at least in part on the data input received from the user, the candidate factor representing an account type or an entity type;
identify at least one candidate from the existing record based at least in part on the one or more candidate factors; and
assign the at least one candidate to a candidate pool, wherein the candidate pool contains at least one of the new record and the at least one candidate.

2. The system of claim 1, wherein the machine-readable instructions further cause the computing device to evaluate candidate data of the new record and the at least one candidate in the candidate pool for a data linkage.

3. The system of claim 1, wherein the at least one candidate is identified based at least in part on one or more matching rules.

4. The system of claim 3, wherein the machine-readable instructions display a match result between the new record and the at least one candidate on a user interface.

5. A system, comprising:
a computing device comprising a processor and a memory; and
machine-readable instructions stored in the memory that, when executed by the processor, cause the computing device to at least:
determine one or more candidates from a candidate pool to be evaluated for a relationship with a new record;
compute a list of unique pair combinations between each one of the one or more candidates of the candidate pool and the new record;
identify candidate data from an existing record for the one or more candidates in the candidate pool based at least in part on one or more matching rules;
evaluate candidate data between the one or more candidates of the candidate pool and the candidate of the new record for a data linkage;
determine a match between the one or more candidates and the new record based at least in part on the one or more matching rules;
calculate a distance between each of the unique pair combinations; and
cluster the candidates of the new record and the existing record into groups based on the distance.

6. The system of claim 5, wherein the machine-readable instructions, when executed by the processor, further cause the computing device to generate a graph based at least in part on the distance between each of the unique pair combinations.

7. A system of claim 5, wherein a score is calculated based at least in part on the distance and a primary key.

8. A system of claim 7, wherein the machine-readable instructions that cause the computing device to calculate the score further cause the computing device to generate a model algorithm, wherein the model algorithm determines a correlation between the list of unique pair combinations based at least in part on the score.

9. The system of claim 5, wherein the one or more candidates and the new record are assigned to a cluster based at least in part on the distance.

10. The system of claim 5, further comprising a user interface configured to allow a user to specify the data to be analyzed for clustering.

11. The system of claim 5, wherein the machine-readable instructions, when executed by the processor, further cause the computing device to calculate a score for each cluster.

12. A system of claim 5, wherein the machine-readable instructions, when executed by the processor, further cause the computing device to correct at least one of an over linkage or an under linkage based at least in part on the distance.

13. A system of claim 5, wherein the one or more candidates and the new candidate record are clustered based at least in part on the distance.

14. A system of claim 5, wherein the match is at least one of an infinity match, an absolute match, or a partial match.

15. A method, comprising:
determining one or more candidates from a candidate pool to be evaluated for a relationship with a new candidate record;
computing a list of unique pair combinations between each one of the candidates of the candidate pool and the new candidate record;

identifying candidate data from an existing candidate record for the one or more candidates in the candidate pool based at least in part on one or more matching rules;

assigning a weight to the one or more matching rules;

evaluating candidate data between the one or more candidates and the new candidate record for a data linkage;

determine a match between the one or more candidates of the candidate pool and the candidate of the new candidate record based at least in part on the one or more matching rules;

calculating a distance between each of the unique pair combinations; and clustering the new candidate record and the existing candidate record into groups based on the distance.

16. The method of claim 15, further comprising calculating a score based at least in part on the distance and a primary key.

17. The method of claim 16, further comprising correcting at least one of an over linkage or an under linkage based at least in part on the score and the distance.

18. The method of claim 15, further comprising generating a model algorithm, wherein the model algorithm determines a correlation between the one or more candidates of the candidate pool and the candidate of new candidate record based at least in part on the distance.

19. The method of claim 15, further comprising assigning the one or more candidates of the candidate pool and the candidate of new candidate record to a cluster based at least in part on the distance.

20. The method of claim 15, wherein the match is at least one of an infinity match, an absolute match, or a partial match.

* * * * *